Dec. 2, 1969   B. D. TONJES   3,481,468
GYRATORY AND JARRING SIEVE SHAKE

Filed Sept. 3, 1968   5 Sheets-Sheet 1

INVENTOR.
BURL D. TONJES
BY
*Hugh A Kirk*
ATTORNEY

United States Patent Office 3,481,468
Patented Dec. 2, 1969

---

3,481,468
GYRATORY AND JARRING SIEVE SHAKE
Burl D. Tonjes, Malinta, Ohio, assignor to Gilson Screen Company, Malinta, Ohio, a partnership composed of Roberta W. Smith, Robert A. Cline, and Robert H. Smith
Continuation-in-part of application Ser. No. 663,785, Aug. 28, 1967. This application Sept. 3, 1968, Ser. No. 767,024
Int. Cl. B07b *1/34, 1/00*
U.S. Cl. 209—237  21 Claims

ABSTRACT OF THE DISCLOSURE

An apparatus for sifting and/or assorting solid particles contained in one or more tiered sieves, having an eccentric drive means for continuously and uniformly spreading the particles over the sieves in a horizontal gyratory path; and epicyclic drive means for a stepped cam operatively connected to the eccentric drive means for slowly moving the sieves downwardly and quickly moving the sieves upwardly to a fast stop for jarring the sieves so that the particles being separated are periodically moved away from the sieves.

RELATED APPLICATIONS

The present application is a continuation-in-part of copending application Ser. No. 663,785 filed Aug. 28, 1967, now abandoned, entitled "Gyratory and Jarring Sieve Shaker."

BACKGROUND OF THE INVENTION

Field of the invention

This invention relates to means by which particles of solid materials are graded and assorted according to the dimensions of their component sizes by passing them through one or more sieves and is particularly directed to sifters which operate by horizontal gyratory, vertical, and periodic jarring movements.

Description of prior art

In an attempt to provide a satisfactory and standarized method of continually presenting new particles to the screen openings and clearing the screen openings when a series of screens are arranged in tiers, the American Society of Testing Materials has formulated a test procedure, namely its specification No. C 136–63, for assorting and grading aggregate materials. This specification sets forth a sifting operation whereby sieves containing the particles of material to be separated and graded, are moved in both horizontal or lateral and vertical directions as well as being periodically jarred, so as to keep the larger particles from clogging the openings in the sieves.

Thus the sieves of the prior art make use of a variety of motions to tumble the particles and prevent the larger and/or odd shaped particles from clogging the openings in the sieves. These motions include verticle reciprocation, transverse reciprocation, continuous rotation, and oscillation, with or without jarring. Often the direction of the motion is inclined so that the particles will tumble over each other. Furthermore it is important that all of these motions, including jarring, do not cause the particles to become clogged in the holes or apertures of the sieves, but rather the jarring should be provided to free any particles that may become so clogged or wedged. In practically all the cases, the object of the motion is to bring continuously into contact with the sieve openings new groups and different sizes of the particles. However, in order to perform these functions and motions including the jarring of the apparatus, the prior art apparatus have either been inadequate in the required motions according to the above A.S.T.M. standards, or if they meet these standards, they have been very expensive.

SUMMARY OF THE INVENTION

Gist of the invention

Generally speaking, this invention embodies a novel mechanism for shaking sieves in a manner to comply with the motion set forth in the above mentioned A.S.T.M. specification. This apparatus comprises a base in which the shaking mechanism is mounted and in which also may be located a motor or other power source for driving the shaking mechanism. Extending from the base, is a horizontally disposed platform which is shaken according to the movements required. This platform is located above the base so that it is easily accessible from all sides. Generally a plurality of sieves are placed on this platform and the material particles to be separated are placed in the top sieve. Usually these sieves are arranged in tiers with the sieve having the largest size openings at the top and with a tray at the bottom. These sieves are held on the platform by a clamping mechanism which may comprise a pair of rods or bolts connected to and extending vertically upwardly from the platform on each side of the sieves with a clamping lid between the bolts which press down against the top of the sieves. This lid may be transparent so that the amount of material left in the top sieve may be easily observed.

The base may have adjustable legs for levelling purposes and inside the base the electric motor may be connected to the driving mechanism in such a way that it can mechanically vary the speed of operation of the shaker. Furthermore, the motor may be provided with a timer for presetting the length of time which it is to operate.

A horizontal gyratory motion may be imparted to the platform by a first drive means comprising an eccentric. This eccentric drive means may be provided with counter balances to reduce the vibration of the apparatus so that the base of the apparatus need not be secured to a support or the floor. A second drive means, which may be driven by the first drive means, comprises an epicyclic wheel, a cooperating resilient ring which may be resiliently mounted or fixedly secured with respect to the base, and in which the epicyclic wheel rolls, and a step cam adapted to reciprocate the platform vertically through a slow downward and a rapid upward movement which is abruptly stopped to jar the platform and prevent clogging of the particles in the sieves placed on the platform. These relative motions of this apparatus are so phased with each other that they continuously and uniformly move and intermittently jar the particles of material being graded as they pass over the surfaces of the sieves.

Objects and advantages

Accordingly it is an object of this invention to provide a simple, efficient, effective, economic, durable, and quiet apparatus for shaking sieves containing particles of materials to be separated both vertically and horizontally with intermittent jarring to comply with the A.S.T.M. specification No. C 136–63.

Another object is to provide such an apparatus in which the jarring motion cleans the screens to prevent clogging by the particles.

Another object is to provide such an apparatus which need not be fixedly secured to a stationary base because it is counter balanced to reduce vibration.

Still another object is to provide such an apparatus with speed adjusting means so it may be operated at peak efficiency for a wide range of material batches and conditions.

BRIEF DESCRIPTION OF THE DRAWINGS

The above mentioned and other features, objects and advantages and the manner of attaining them are described more specifically below by reference to the embodiments of the invention shown in the accompanying drawings, wherein.

DETAILED DESCRIPTION

General

Figure 2A:
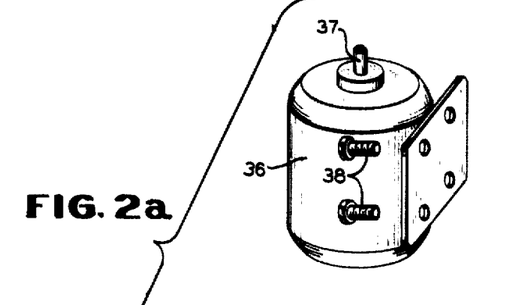
FIG. 2a is an enlarged exploded perspective view showing the base and power drive means of the sieve shaker shown in FIG. 1.
Figure 3:
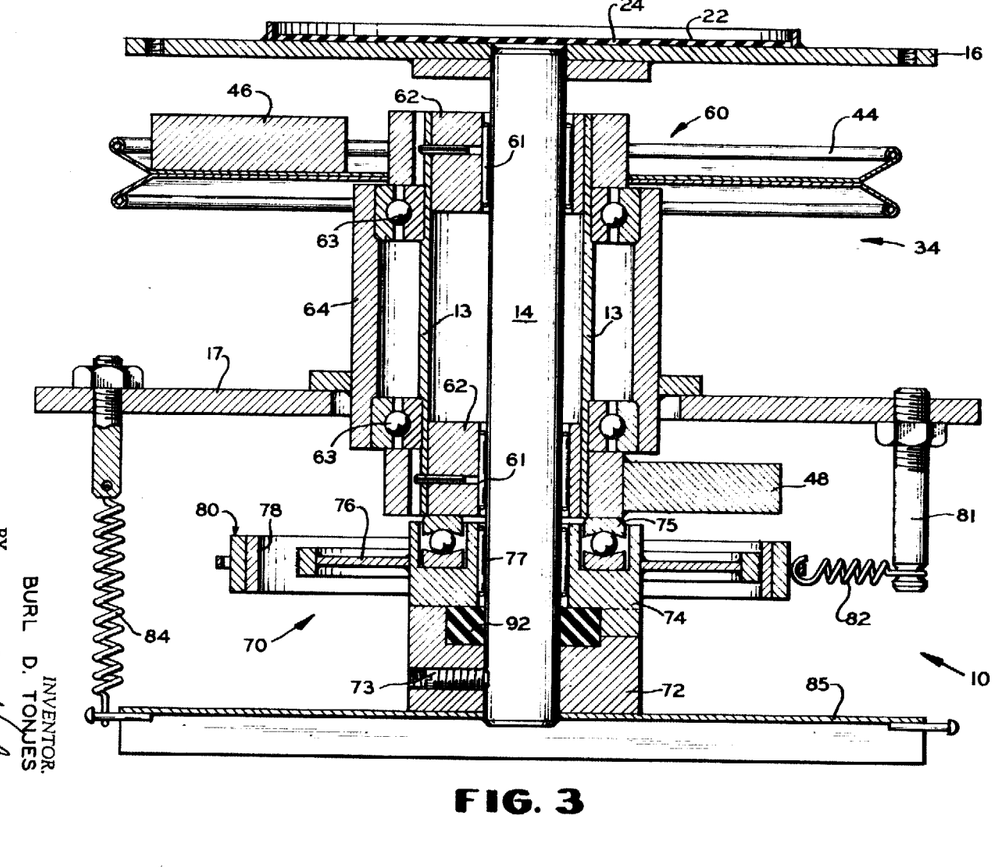
FIG. 3 is a vertical cross-section view of the assembled gyratory, reciprocating, and jarring means shown in FIG. 2b.
Figure 4:
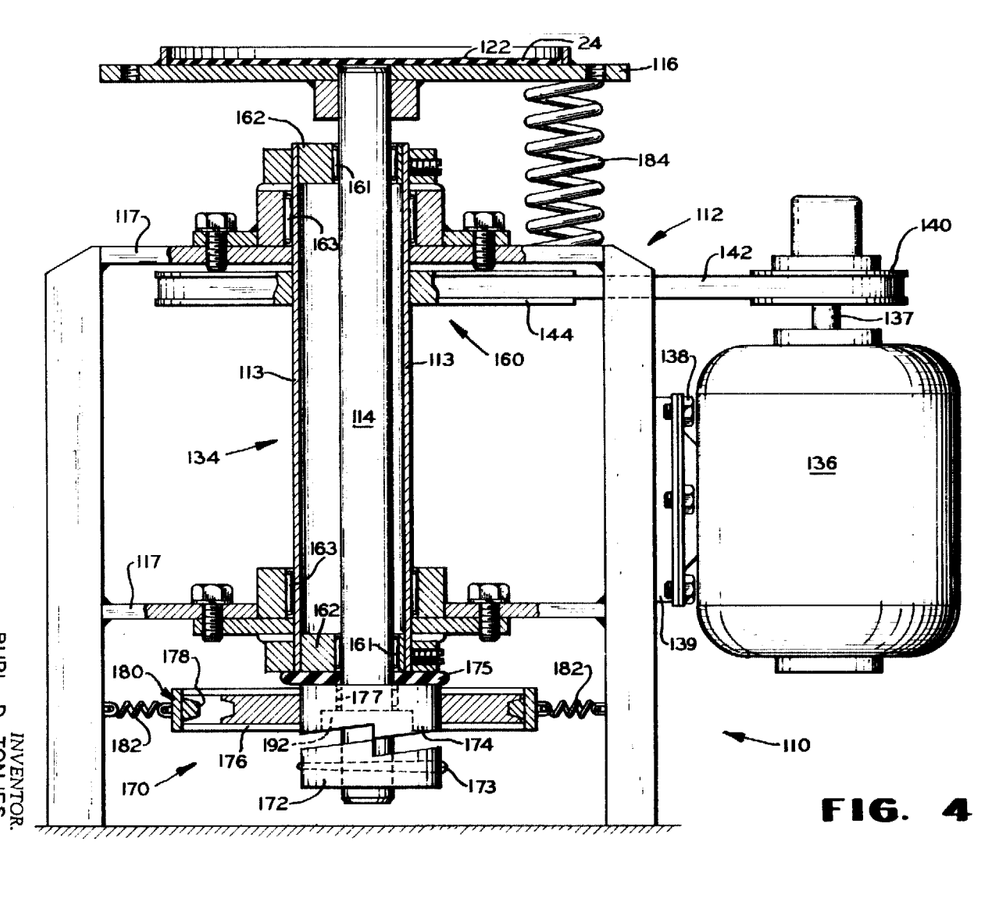
FIG. 4 is a vertical cross-sectional view similar to FIG. 3, of another embodiment of this invention.
Figure 5:
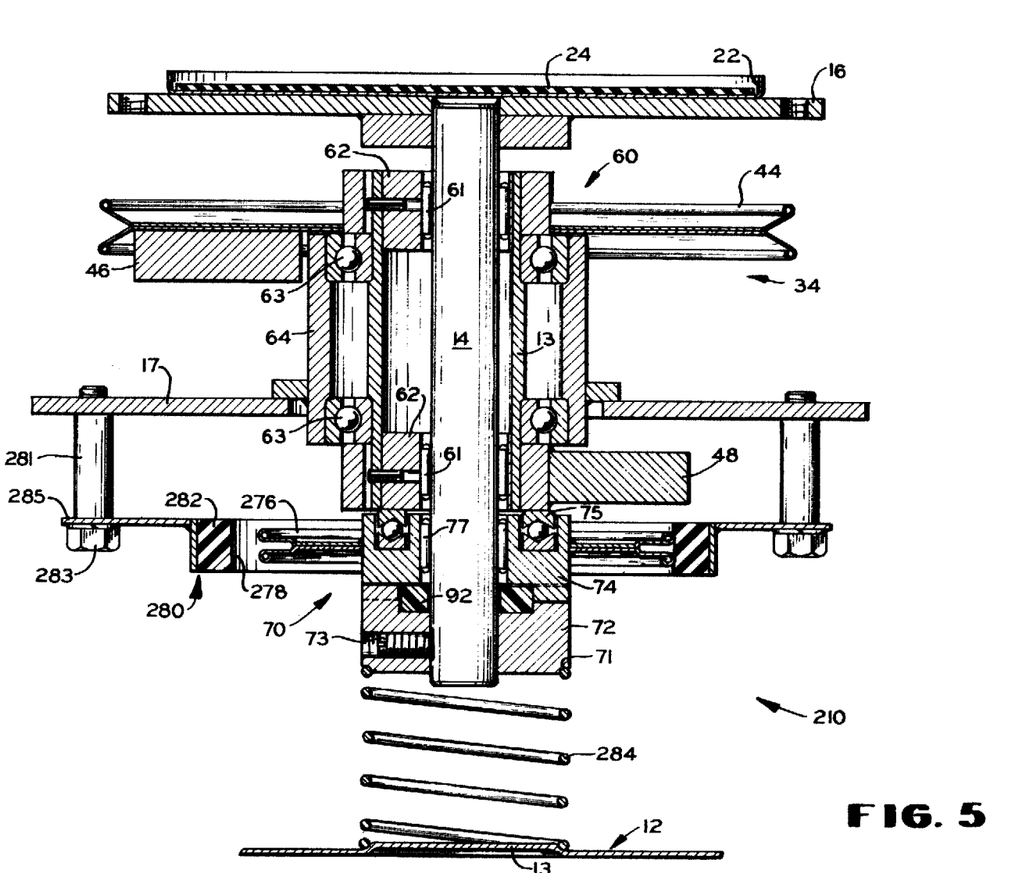
FIG. 5 is a vertical cross-sectional view similar to FIG. 3 of another embodiment of this invention.

Referring to all the figures in general, and particularly to FIGS. 3, 4 and 5, there are shown three embodiments of a portable sieve shaker apparatus 10, 110 and 210 of this invention, respectively, which have bases or supporting parts 12 for the apparatus 10 or 210 (see FIGS. 3 and 5), and 112 for the apparatus 110 (see FIG. 4) that may rest on a work bench, table or floor. The structure of the apparatus 10 and 210 are quite similar to each other in many respects and each employs similar elements. Thus these similar elements will be described together and identified by the same reference characters. Also these bases 12 and 112 may be provided with resilient vertically adjustable legs or feet 11 (see FIGS. 1 and 2a) for horizontal levelling of platforms 16 (see FIGS. 3 and 5) and 116 (see FIG. 4).

These bases 12 and 112 provide housings or supports for the driving means for the apparatus including rotating vertical hollow shafts or sleeves 13 and 113 in which are eccentrically journalled axially movable shafts 14 and 114 to the upper ends of which are horizontally attached platforms 16 and 116. These sleeves 13 and 113 may be supported by horizontal plates 17 and 117 in these bases 12 and 112, respectively.

Figure 1:
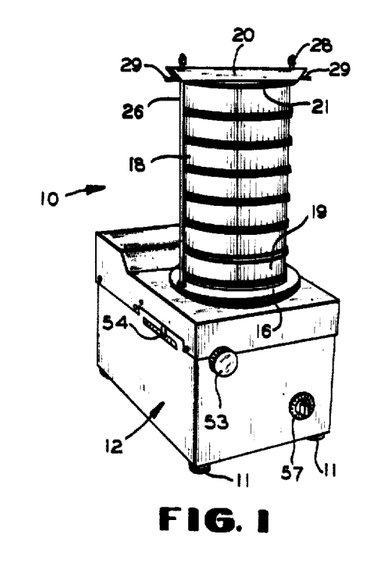
FIG. 1 is a perspective view of a sifting apparatus which embodies a preferred form of this invention.

It is on these platforms 16 and 116 that one or more sieves are clamped, such as in a tier or combination of substantially vertically arranged round sieves 18 (see FIG. 1). As shown in FIGS. 1 and 2b, these sieves 18 are clamped together between a clamp bar member 20 having a transparent, such as plastic, lid or cover 21, and retaining rims 22 and 122 provided on the platform 16 and 116, respectively. In order that the sieves 18 may be securely held in place, a resilient pad 24 may be placed inside these rims 22 and 122. This clamping member 20 may be adjustably secured to rods 26 and 28 by friction lock means, such as spring loaded levers 29, and the rods 26 and 28 may be securely fixed to the platforms 16 and 116 by threaded means which may include nuts 30 and 32, respectively.

The platforms 16 (see FIGS. 3 and 5) and 116 (see FIG. 4), may be moved by the operation of a phased combination motion transmitting means 34 and 134 journalled on the stationary supports 12 and 112, respectively. These motion transmitting means comprise eccentric or first horizontal drive mechanisms 60 and 160, and epicyclic or second vertical drive mechanisms 70 and 170. These motion transmitting means 34 and 134 may be driven by electric motors 36 and 136, also mounted on the bases or supporting parts 12 and 112, respectively.

Power drive means

The electric motors 36 and 136 each have a shaft 37 and 137 (see FIGS. 2a and 4, respectively) extending vertically upward for driving the motion transmitting means 34 and 134. These motors are shown to be mounted by bolts 38 and 138 on a vertical wall or plate 39 and 139 on the bases 12 and 112. On their shafts 37 and 137 may be mounted variable pitch diameter pulleys 40 and 140 for V-belts 42 and 142. These V-belts 42 and 142 may be tensioned on pulleys 44 and 144, respectively, which are keyed to the hollow shafts or sleeves 13 and 113. The diameters of the motor shaft pulleys 40 and 142, preferably are less than the diameters of the sleeve pulleys 44 and 144 so that the combination of the pulleys and V-belts act as a speed reduction device. The sleeve pulleys 44 and 144 and hollow shafts 13 and 113 may be provided with counter balances (such as 46 and 48, see FIGS. 2b, 3 and 5) to counteract vibrations caused by the eccentricity of the shafts 14 and 114 and the weight of the sieves placed on their platforms 16 and 116. Thus the apparatus 10, 110 and 210 do not have to be anchored to their supporting benches, tables, or floors.

Figure 2B:
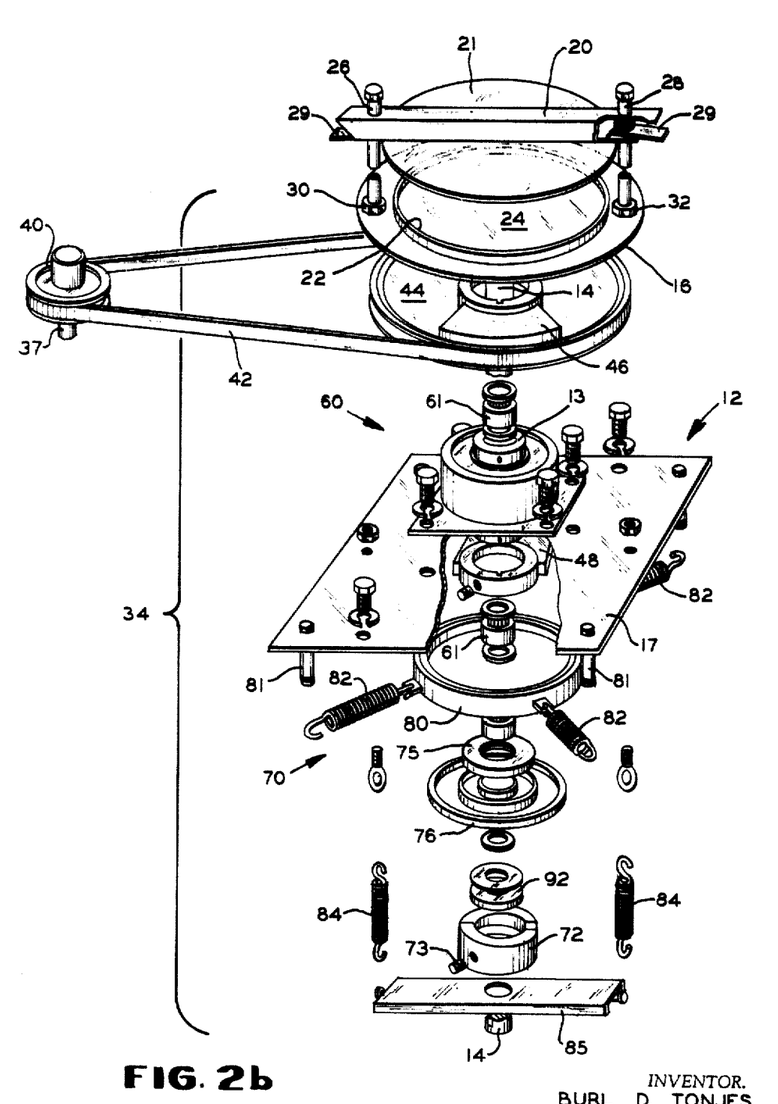
FIG. 2b is an enlarged exploded perspective view showing the eccentric horizontal gyratory motion means and the epicyclic vertical reciprocating motion and jarring means of the sieve shaker shown in FIG. 1 and their relationship to each other.

In FIG. 2a the vertical wall or plate 39 upon which the motor 36 is mounted by the bolts 38 is shown vertically hinged at 45 along one edge so that the tension in the belt 42 may be varied to spread the sides of the variable pitch diameter pulley 40 to vary the speed of rotation of the hollow shaft 13 of the agitation unit 10 or 210. The hinge plate 39 is pivotally connected near its other edges to an inside threaded sleeve 51 adjustable with respect to a rotatable externally threaded member 52 journalled in the base 12. The outer end of this externally threaded member 52 may have an externally fixed knob 53 for turning adjustment of the internally threaded sleeve 51. The sleeve 51 may be provided with a pointer 54 to indicate the relative variations in the speed of the apparatus as the motor 36 is moved toward and away from the pulley 44 by turning the knob 53 to decrease and increase the effective driving diameter of the variable pitch pulley 40. This type of variable speed mechanism also may be provided for the motor 136 in FIG. 4, although it is not shown, or instead a variable speed motor 36 and 136 may be employed which is controlled by a dial (not shown) on the base 12 and 112, respectively.

An electric conductor wire plug 55 and line cord 56 may be inserted into an electrical power socket and turned "ON" by a switch, such as an adjustable timer switch 57 (see FIGS. 1 and 2) for starting the motor 36 or 136 and continuing its operation for a pre-set period of time, such as up to fifteen minutes, before being shut off by the automatic timer.

Eccentric horizontal gyratory motion means

Referring to FIGS. 2b, 3, 4 and 5, the eccentric or first drive mechanism 60 and 160 impart a horizontal gyratory motion to the platforms 16 and 116, respectively, and their sieves 18 of the shaker apparatus 10, 110 and 210. This gyratory motion is provided by means of the axially movable shafts 14 and 114 fixed at their upper ends to the platforms 16 and 116, and journalled in the spaced needle bearings 61 and 161 in the eccentric members 62 and 162. These bearings 61 and 161 are fixed inside each end of the hollow shafts or sleeves 13 and 113, respectively. These hollow shafts or sleeves 13 and 113 may be journalled in spaced bearings 63 and 163 anchored to the bases 12 and 112, respectively. In FIGS. 2b, 3 and 5 these latter bearings 63 may be mounted in a stationary vertical sleeve 64 fixed to the horizontal plate 17; and in FIG. 4 these latter bearings 163 may be mounted in the spaced horizontal plates 117.

Epicyclic vertical reciprocating motion and jarring means

The epicyclic or second drive motion mechanisms 70 and 170 for imparting a relatively slow downward movement and a quick upward jarring movement to the sieve supporting platforms 16 and 116 are also shown in FIGS. 2b, 3, 4 and 5. To reciprocally move the platforms 16 and 116 in these vertical paths, there is shown mounted at the lower end of each of the depending shafts 14 and 114 a resiliently biased opposed faced step cam means comprising lower and upper elements 72, 74 and 172, 174, respectively.

In this instance the lower cam elements 72 and 172 of each embodiment are keyed or locked as shown at 73 and 173 to the lower ends of shafts 14 and 114, respectively, while the other and relatively axially immovable upper cooperating cam elements 74 and 174 are rotatably journalled thereon by bearings 77 and 177 respectively to permit the shafts 14 and 114 to move axially. If desired, a thrust bearing 75 may be provided between the upper cam element 74 and the eccentric 62 as shown in FIGS. 3 and 5 or a cushion member 175 between the upper cam element 174 and the eccentric 162 as shown in FIG. 4.

The rotatably journalled cam elements 74 and 174 are fixed to epicyclic or planetary wheel means 76 or 276 (see FIGS. 3 and 5) and 176 (see FIG. 4), respectively. These gyrating epicyclic wheels 76 or 276 and 176, which freely rotate on the eccentric shafts 14 and 114, roll about the inner peripheries 78 or 278 and 178 of ring members 80 or 280 and 180 by means of their eccentricity on the eccentric shafts 14 and 114 relative to the ring members 80 or 280 and 180, respectively. The ring members 80 and 180, see FIGS. 3 and 4, are resiliently held substantially concentric with the sleeves 13 and 113, respectively. These resilient mountings for the rings 80 and 180 insure their continuous urging engagement with the epicyclic wheels 76 and 176 and reduce the necessity of accurate machining of and compensate for wear of these parts. These resilient mountings may comprise a plurality of radially outwardly extending tension springs 82 (see FIGS. 2b and 3) and 182 (see FIG. 4), respectively, around the ring members 80 and 180, such as to parts 81 as shown in FIGS. 2b and 3 of the base 12, or directly to the base frame 112 as shown in FIG. 4. The internal faces 78 and 178 of these ring members 80 and 180 and the outer periphery of wheels 76 and 176 can be provided with gear teeth, or, as herein shown, roughened or ribbed frictional material to prevent slipping of the epicyclic wheels 76 and 176. These tension springs 82 and 182 should be of equal strength so as to provide the most tension opposite and the least tension adjacent the moving points of contact between the periphery of the epicyclic wheels 76 and 176 and the internal faces 78 and 178 of the ring members 80 and 180.

Alternately the ring member 280 may be securely held substantially concentric with the sleeve 13 by providing it with a substantially thickened resilient compressible ring portion 282 so that its inner periphery 278 is continually urged against the epicyclic wheel 276. The mounting for this resilient ring 280 may comprise a plate 285 supported by a plurality of cylindrical spacers 281 depending from the stationary plate 17 by means of bolts 283. The internal face 278 of this ring member 280 and the outer periphery of the wheel 276 may also be provided with gear teeth, ribbed frictional material, or, as herein shown the face of the gear 276 may bear directly against the compressible ring portion 282 which has a high coefficient of friction.

Thus in each apparatus 10 or 210 and 110, the upper cam elements 74 and 174 are positively rotated relative to the lower cam elements 72 and 172, at a speed less than that of the gyrations of the shafts 14 and 114. This difference in speed depends upon the relative diameters of the epicyclic wheels 76 or 276 and 176 to that of the inside peripheries 78 or 278 and 178 of the ring members 80 or 280 and 180, respectively, which diameters are limited by the amount of eccentricity of the shafts 14 and 114. Thus, for example, with an eccentricity of a half an inch, and a wheel 76 or 276 and 176 of six inches in diameter, the inside diameter of the rings 80 or 280 and 180 should be about six and three eighths inches. Then the wheels 76 or 276 and 176 will rotate once for about every thirteen gyrations of the shafts 14 and 114. The reason that the diameters of the rings are less than one half inch larger than the wheels is to insure the intimate contact between them. If the difference in their diameters were greater than this one half inch of the eccentricity, then there would be no contact between the wheels and rings.

Accordingly, when the shafts 14 and 114 are caused to move in their gyratory paths by their respective motors 36 and 136, the upper cam elements 74 and 174 are also caused to move in a similar gyratory path, and since these upper cam elements are connected to epicyclic planetary wheels which roll on the inner peripheries 78 or 278 and 178 of their cooperating ring members 80 and 180, they will rotate relative to the lower cam elements 72 and 172. These lower cam elements 72 and 172 are prevented from rotating because they are keyed at 73 and 173 to the shafts 14 and 114 and the shafts and platform are prevented from rotating either by frictional engagement with the strap 85 and spring 84 in FIG. 3, or by the spring 184 in FIG. 4 or by the spring 284 in FIG. 5. The tension springs 84 in FIGS. 2b and 3 are shown between the strap member 85 and plate 17 on the base 12. In FIG. 4 at least two and preferably three compression springs 184 are employed between the under side of the platform 116 and the stationary support or base 112. In FIG. 5 at least one compression spring 284 is employed between the under side of the cam element 72 and a raised portion 13 on a surface of the stationary base 12. The end of the spring 284 bearing against the cam element 72 is preferably seated in a groove 71 so that it will not be dislodged when the cam 72 moves in its gyratory path.

Since the opposed faces of both the upper and lower cam elements 72, 74 and 172, 174 are inclined and diametrically opposite axially stepped with respect to each other, and when the upper cams 74 and 174 rotate with respect to the lower cams 72 and 172, their inclines cause them to move slowly apart. This in turn causes the platforms 16 and 116 to move slowly downward, since the upper cam elements 74 and 174 are fixed against axial movement by the action of the springs 84 or 284 and 184 which urge these cam elements against the thrust bearing 75 or cushion 175.

These springs 84 or 284 and 184 also move the platforms 16 and 116 quickly upward when the cams 72, 172 and 74, 174 move off their diametrically opposite steps twice each revolution of the upper cam elements 74 and 174, and thus jar the sieves 18 to a quick stop so as to dislodge any particles upwardly which may clog the top of the openings in the sieves 18. One or both of the opposed faces of these cam elements 72, 74 and 172, 174 may be provided with impact washers 92 and 192, such as of nylon or neoprene, to absorb the impact of the abrupt stops and to provide the apparatus with a quieter operation.

Operation of the shaker apparatus

Assuming that the shaker 10 or 210 is assembled as shown in FIG. 1 with the mesh of the sieves 18 becoming finer toward the bottom of the unit, and that it is desired to sort and separate a sample of material, say fine gravel and/or sand particles, into seven size oriented portions, there are a tier of six interfitting sieves 18 and one bottom or receiver tray 19. The sample of material to be separated is introduced into the top sieve and a plastic lid 21 is put on it so that no material escapes from the unit. The clamp member 20 then is placed on the lid 21 tightly to clamp the sieves 18 on the platform 16. The timer 57 is then turned to the desired time for shaking and to start the motor 36. This causes the eccentrically mounted shaft 14 to gyrate the platform 16 and the sieves 18 thereon. As the particle sample is agitated in this manner, the small particles will fall downwardly until they encounter a sieve which has a mesh too fine to pass them; in such case the particles are retained in this sieve. As the sample is sifted and sorted, more and more particles will be collected on each sieve and restrict passage of other and smaller particles through the unit. Thus the periodic vertical jarring motion by quickly stopping the fast upward movement of the sieves by the action of the step cams 72, 74 of the apparatus after more than one gyration, unclogs and clears the screens of all the particles, so that small particles may reach the screens to pass through them and not be blocked by the larger particles which cannot pass through them. This combined gyratory and jarring movement assures that all of the particles of the sample move over each other and flow or tumble around the sieve so that all of the particles of the sample are presented to the openings of the sieves and that a thorough and complete sifting operation is performed. This action also permits larger samples to be completely separated. The shaker apparatus 110 also functions in a like manner.

I claim:
1. A shaker mechanism comprising:
 (a) a support (12, 112),
 (b) a horizontal platform (16, 116) to be shaken and supported by said support,
 (c) means (60, 160) for imparting a horizontal gyratory motion to said platform,
 (d) means (70, 170) for imparting a slow downward and quick upward reciprocating motion to said platform with an abrupt stop to said upward motion, said means including an epicyclic wheel (76, 176, 276), a ring member (80, 180, and 280), and cam means (72, 74; 172, 174), and
 (e) power means (36, 136) for driving said motion means.

2. A mechanism according to claim 1 wherein said horizontal platform includes means (20) for clamping articles (18, 19, 21) thereon.

3. A mechanism according to claim 2 wherein said articles comprise at least one sieve (18) for separating particles of solid materials.

4. A mechanism according to claim 1 wherein said means for imparting said gyratory motion comprises a vertical eccentric shaft (14, 114) attached to said platform.

5. A mechanism according to claim 4 wherein said means for imparting said horizontal gyratory motion includes a rotatable hollow sleeve (13, 113) in which said vertical shaft is eccentrically journalled for axial movement.

6. A mechanism according to claim 1 wherein said means for imparting said reciprocating motion is driven by said means for imparting said gyratory motion.

7. A mechanism according to claim 1 wherein said power means is mounted on said support.

8. A mechanism according to claim 7 wherein said power means comprises an electric motor.

9. A mechanism according to claim 1 wherein the power means includes means (51) for varying the speed of said motion means.

10. A mechanism according to claim 1 wherein said power means includes means (52) for adjusting the time of operation thereof.

11. A mechanism according to claim 1 wherein said means for imparting said reciprocating motion operates only once every several gyrations.

12. A gyratory and jarring shaker mechanism for a platform comprising:
 (a) a support (12, 112) for said mechanism,
 (b) eccentric means (60, 160) journalled in said support for gyrating said platform,
 (c) means (36, 136) for driving said eccentric means,
 (d) epicyclic means (70, 170) connected to said eccentric means, and
 (e) step cam means (72, 74, 172, 174) driven by said epicyclic means for axially moving and jarring said platform.

13. A mechanism according to claim 12 wherein said platform is horizontal and wherein said eccentric means comprises a vertical shaft (14, 114) which is axially reciprocable.

14. A mechanism according to claim 12 wherein said driving means comprises a motor, a variable pitch pulley (40) and belt (42) connected between said motor and said eccentric means.

15. A mechanism according to claim 14 wherein said motor is mounted upon a hinge plate (39) operated by means (51) for varying said distance between said motor and said eccentric means to vary the pitch of said pulley to vary the speed of said eccentric means.

16. A mechanism according to claim 12 wherein said epicycle means comprises a planetary wheel (76, 176, 276) and a ring member (80, 180, 280) around the inside of which said planetary wheel is rotated by said eccentric means.

17. A mechanism according to claim 16 including resilient means (82, 182) for mounting said ring member so as to urge said ring member continuously against said planetary wheel.

18. A mechanism according to claim 12 wherein said step cam means comprises a pair of cooperating step cams and spring means (84, 184, 284) acting against said support for urging said cooperating step cam surfaces toward each other.

19. A gyratory, reciprocating, and jarring sieve shaker comprising:
 (a) a support (12, 112),
 (b) a sleeve (13, 113) rotatably journalled in said support,
 (c) means (36, 136) for rotating said sleeve,
 (d) a shaft (14, 114) rotatably and axially journalled in said sleeve eccentrically to the axis of said sleeve,
 (e) a pltaform (16, 116) connected to said shaft for gyration as said sleeve rotates,
 (f) a saw tooth step cam (72, 172) keyed to said shaft,
 (g) an epicyclic wheel means (76, 176, 276),
 (h) a cooperating saw tooth step cam (74, 174) journalled on said shaft and keyed to said epicyclic wheel means,
 (i) resilient means (84, 184, 284) acting against said support for restricting the rotation of said shaft relative to said support,
 (j) ring means (80, 180, 280) around the inside of which said wheel means rolls, and
 (k) resilient means (82, 182, 282) between said support and said ring means for maintaining said ring means in rolling contact with said wheel means while said wheel means gyrates on said shaft, to rotate said cam attached to said wheel means relative to said cam keyed to said shaft, whereby said cams ride over their steps to axially jar said platform only after an opposite vertical movement and more than one gyration of said platform.

20. A mechanism according to claim 19 wherein said resilient means comprises spring means (82, 182).

21. A mechanism according to claim 19 wherein said resilient means comprises a resilient compressible ring (282).

References Cited

UNITED STATES PATENTS

| | | | |
|---|---|---|---|
| 857,942 | 6/1907 | Howard | 209—237 |
| 1,057,053 | 3/1913 | Halliday | 209—366 X |
| 1,291,371 | 1/1919 | Bell | 209—309 X |
| 1,324,952 | 12/1919 | Rawson et al. | 74—230.17 |
| 1,450,166 | 4/1923 | Bell | 209—237 |
| 1,984,507 | 12/1934 | Waner | 74—230.17 |
| 2,194,721 | 3/1940 | Piper | 209—366 X |
| 2,212,818 | 8/1940 | Stoltzfus | 209—332 |
| 2,284,671 | 6/1942 | Meinzer | 209—237 X |
| 2,432,766 | 12/1947 | Kirby | 74—86 X |
| 2,506,133 | 5/1950 | Browne | 74—52 X |
| 2,730,236 | 1/1956 | Missien | 209—237 |
| 3,273,409 | 9/1966 | Holman | 209—366 X |

TIM R. MILES, Primary Examiner

U.S. Cl. X.R.

74—26, 52, 230.17; 209—315, 326, 366

PO-1050
(5/69)

UNITED STATES PATENT OFFICE
CERTIFICATE OF CORRECTION

Patent No. 3,481,468   Dated December 2, 1969

Inventor(s) Burl D. Tonjes

It is certified that error appears in the above-identified patent and that said Letters Patent are hereby corrected as shown below:

In the Title on the drawings and the first page of the specification, "SHAKE" should read -- SHAKER --; column 4, line 42, "edges" should read -- edge --; column 5, line 75, "gear" should read -- wheel --.

SIGNED AND
SEALED
JUN 9 1970

(SEAL)
Attest:

Edward M. Fletcher, Jr.
Attesting Officer

WILLIAM E. SCHUYLER, JR.
Commissioner of Patents